(12) United States Patent  (10) Patent No.: US 9,146,560 B2
Burnett et al.  (45) Date of Patent: Sep. 29, 2015

(54) SYSTEM AND METHOD FOR IMPLEMENTING FORCE FIELD DETERRENT FOR ROBOT

(75) Inventors: Scott Thomas Burnett, Windham, NH (US); Jared Randall Maroon, Brighton, MA (US)

(73) Assignee: iRobot Corporation, Bedford, MA (US)

( * ) Notice: Subject to any disclaimer, the term of this patent is extended or adjusted under 35 U.S.C. 154(b) by 648 days.

(21) Appl. No.: 13/436,024

(22) Filed: Mar. 30, 2012

(65) Prior Publication Data

US 2013/0261867 A1  Oct. 3, 2013

(51) Int. Cl.
*G05D 1/02* (2006.01)
*F21V 9/04* (2006.01)

(52) U.S. Cl.
CPC ............ *G05D 1/0234* (2013.01); *G05D 1/0225* (2013.01); *G05D 1/0227* (2013.01); *G05D 1/0272* (2013.01); *A47L 2201/04* (2013.01); *G05D 2201/0215* (2013.01)

(58) Field of Classification Search
CPC . G05D 1/0225; G05D 1/0234; G05D 1/0242; G05D 2201/0203; G05D 2201/0215; A47L 9/2894; A47L 11/4011; B25J 9/0003
USPC ............................................ 701/23; 359/350
See application file for complete search history.

(56) References Cited

U.S. PATENT DOCUMENTS

| | | | |
|---|---|---|---|
| 3,660,817 A * | 5/1972 | Abrams | 340/908 |
| 4,710,020 A | 12/1987 | Maddox et al. | |
| 5,165,064 A | 11/1992 | Mattaboni | |
| 5,995,884 A | 11/1999 | Allen et al. | |
| 6,389,329 B1 | 5/2002 | Colens | |
| 6,532,404 B2 | 3/2003 | Colens | |
| 6,594,844 B2 | 7/2003 | Jones | |
| 6,671,592 B1 | 12/2003 | Bisset et al. | |
| 6,690,134 B1 | 2/2004 | Jones et al. | |
| 6,781,338 B2 | 8/2004 | Jones et al. | |
| 6,809,490 B2 | 10/2004 | Jones et al. | |
| 6,965,209 B2 | 11/2005 | Jones et al. | |
| 7,024,278 B2 | 4/2006 | Chiappetta et al. | |
| 7,079,923 B2 | 7/2006 | Abramson et al. | |
| 7,133,746 B2 | 11/2006 | Abramson et al. | |
| 7,155,308 B2 | 12/2006 | Jones | |
| 7,167,775 B2 | 1/2007 | Abramson et al. | |
| 7,173,391 B2 | 2/2007 | Jones et al. | |
| 7,196,487 B2 | 3/2007 | Jones et al. | |
| 7,211,980 B1 | 5/2007 | Bruemmer et al. | |
| 7,328,196 B2 | 2/2008 | Peters | |
| 7,332,890 B2 | 2/2008 | Cohen et al. | |
| 7,388,343 B2 | 6/2008 | Jones et al. | |
| 7,389,156 B2 | 6/2008 | Ziegler et al. | |
| 7,448,113 B2 | 11/2008 | Jones et al. | |
| 7,571,511 B2 | 8/2009 | Jones et al. | |

(Continued)

*Primary Examiner* — John Q Nguyen
*Assistant Examiner* — Kyung Kim
(74) *Attorney, Agent, or Firm* — Honigman Miller Schwartz and Cohn LLP

(57) ABSTRACT

A robot navigation system includes a robot, a navigation beacon, and a cover structure. The robot includes a chassis, an omni-directional receiver, and at least one directional receiver. The navigation beacon includes an omni-directional infrared emitter and at least one directional infrared emitter. The cover structure is configured to block infrared transmissions between the at least one directional infrared emitter and the directional receiver while simultaneously permitting transmissions between the omni-directional infrared emitter and the omni-directional receiver. The cover structure may be made of a black silicone material.

19 Claims, 21 Drawing Sheets

(56) References Cited

U.S. PATENT DOCUMENTS

| | | |
|---|---|---|
| 7,636,982 B2 | 12/2009 | Jones et al. |
| 7,663,333 B2 | 2/2010 | Jones et al. |
| 7,706,917 B1 | 4/2010 | Chiappetta et al. |
| 7,761,954 B2 | 7/2010 | Ziegler et al. |
| 2002/0016649 A1 | 2/2002 | Jones |
| 2002/0120364 A1 | 8/2002 | Colens |
| 2003/0009259 A1 | 1/2003 | Hattori et al. |
| 2003/0025472 A1 | 2/2003 | Jones et al. |
| 2004/0020000 A1 | 2/2004 | Jones |
| 2004/0049877 A1 | 3/2004 | Jones et al. |
| 2004/0085037 A1 | 5/2004 | Jones et al. |
| 2004/0093122 A1 | 5/2004 | Galibraith |
| 2004/0128028 A1 | 7/2004 | Miyamoto et al. |
| 2004/0153212 A1 | 8/2004 | Profio et al. |
| 2004/0187457 A1 | 9/2004 | Colens |
| 2004/0207355 A1 | 10/2004 | Jones et al. |
| 2004/0210345 A1 | 10/2004 | Noda et al. |
| 2005/0010330 A1 | 1/2005 | Abramson et al. |
| 2005/0067994 A1 | 3/2005 | Jones et al. |
| 2005/0156562 A1 | 7/2005 | Cohen et al. |
| 2005/0204717 A1 | 9/2005 | Colens |
| 2005/0213082 A1 | 9/2005 | DiBernardo et al. |
| 2005/0288819 A1 | 12/2005 | de Guzman |
| 2006/0087273 A1 | 4/2006 | Ko et al. |
| 2006/0259194 A1 | 11/2006 | Chiu |
| 2006/0293787 A1 | 12/2006 | Kanda et al. |
| 2007/0042716 A1 | 2/2007 | Goodall et al. |
| 2007/0061041 A1 | 3/2007 | Zweig |
| 2007/0244610 A1* | 10/2007 | Ozick et al. .............. 701/23 |
| 2007/0266508 A1 | 11/2007 | Jones et al. |
| 2008/0091304 A1 | 4/2008 | Ozick et al. |
| 2008/0140255 A1 | 6/2008 | Ziegler et al. |
| 2008/0155768 A1 | 7/2008 | Ziegler et al. |
| 2008/0281470 A1 | 11/2008 | Gilbert et al. |
| 2008/0307590 A1 | 12/2008 | Jones et al. |
| 2010/0049365 A1 | 2/2010 | Jones et al. |
| 2010/0257690 A1 | 10/2010 | Jones et al. |
| 2010/0257691 A1 | 10/2010 | Jones et al. |
| 2010/0263158 A1 | 10/2010 | Jones et al. |

\* cited by examiner

SYSTEM AND METHOD FOR IMPLEMENTING FORCE FIELD DETERRENT FOR ROBOT

INTRODUCTION

The present teachings relate to robots, and more particularly to a system and method for implementing a force field to deter autonomous robots.

BACKGROUND

Autonomous robots are robots which can perform desired tasks in unstructured environments without continuous human guidance. Many kinds of robots are autonomous to some degree. Different robots can be autonomous in different ways. An autonomous coverage robot traverses a work surface without continuous human guidance to perform one or more tasks. In the field of home, office and/or consumer-oriented robotics, mobile robots that perform household functions such as vacuum cleaning, floor washing, patrolling, lawn cutting and other such tasks have been widely adopted.

Navigation beacons are used to bound an area in which the robot operates. Bounding an area may be done, for example, to restrict a robot from entering or leaving an area. However, even when robots are restricted to a bounded area, it is often inconvenient to remove all items from an area in which the robot is performing tasks. It would be useful to have a way to deter a robot from entering a designated area within its bounded territory, in order to prevent the need to remove items that may suffer damage or otherwise not benefit from a physical impact with a robot.

SUMMARY

The present teachings provide a structure configured to limit infrared transmission between a navigation beacon having at least two infrared emitters and a robot having at least two receivers. The structure comprises: a top portion having an opening; a wall portion having an upper periphery, a lower periphery, and a height extending between the upper and lower peripheries, the upper periphery of the wall portion adjoining a periphery of the top portion, the top and wall portions together defining a volume sized to receive at least a portion of a navigation beacon, the wall portion configured to block an infrared signal transmitted by an infrared emitter on the portion of the navigation beacon positionable within the volume; and an opening in the top portion of the structure being configured to receive an infrared emitter of the navigation beacon.

The present teachings also provide a robot navigation system, comprising: a robot having a chassis, an omni-directional receiver, and at least one directional receiver; a navigation beacon having an omni-directional infrared emitter and at least one directional infrared emitter; and a cover structure configured to block infrared transmissions between the at least one directional infrared emitter and the directional receiver while simultaneously permitting transmissions between the omni-directional infrared emitter and at least one of the omni-directional receiver and the at least one directional receiver.

The present teachings further provide a method of limiting infrared transmission between a navigation beacon having an omni-directional infrared emitter and at least one directional infrared emitter and a robot having a chassis, an omni-directional receiver, and at least one directional receiver. The method comprises: positioning a cover structure configured to block infrared transmissions between the at least one directional infrared emitter and at least one of the directional receiver and the omni-directional receiver; and substantially simultaneously positioning the omni-directional infrared emitter outside of the cover structure to permit communication with the at least one receiver.

Additional objects and advantages of the present teachings will be set forth in part in the description which follows, and in part will be obvious from the description, or may be learned by practice of the teachings. The objects and advantages of the present teachings will be realized and attained by means of the elements and combinations particularly pointed out in the appended claims.

It is to be understood that both the foregoing general description and the following detailed description are exemplary and explanatory only and are not restrictive of the present teachings, as claimed.

The accompanying drawings, which are incorporated in and constitute a part of this specification, illustrate exemplary embodiments of the present teachings and, together with the description, serve to explain the principles of the present teachings.

DESCRIPTION OF THE EMBODIMENTS

Reference will now be made in detail to exemplary embodiments of the present teachings, examples of which are illustrated in the accompanying drawings. Wherever possible, the same reference numbers will be used throughout the drawings to refer to the same or like parts.

Figure 1:
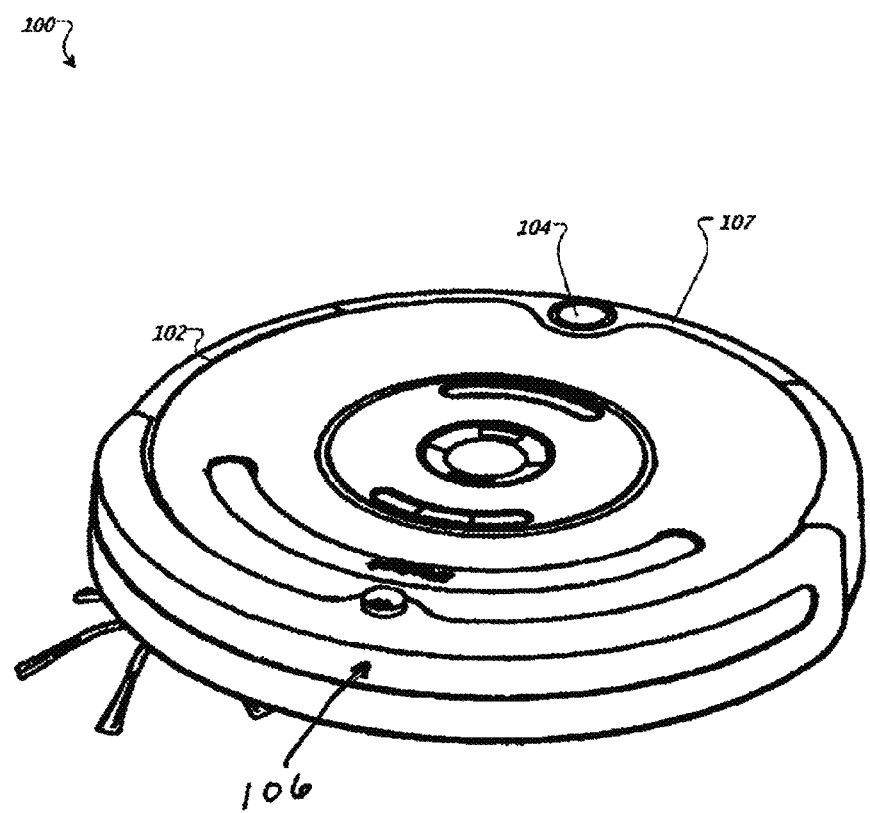
FIG. 1 is a perspective view showing an example of an autonomous coverage robot in accordance with the present teachings.

FIG. 1 shows an above-perspective view of an autonomous coverage robot 100. The robot 100 has a chassis 102, a controller (not shown), an omni-directional receiver 104, and a directional receiver 106. Chassis 102 has a forward drive direction and carries the controller and the receivers 104 and 106 on a bumper 107. Receivers 104 and 106 provide navigation information to the controller. Using input from receivers 104 and 106, the controller generates commands to be carried out by the robot 100. As a result, the robot 100 is capable of cleaning floors in an autonomous fashion.

Figure 2:
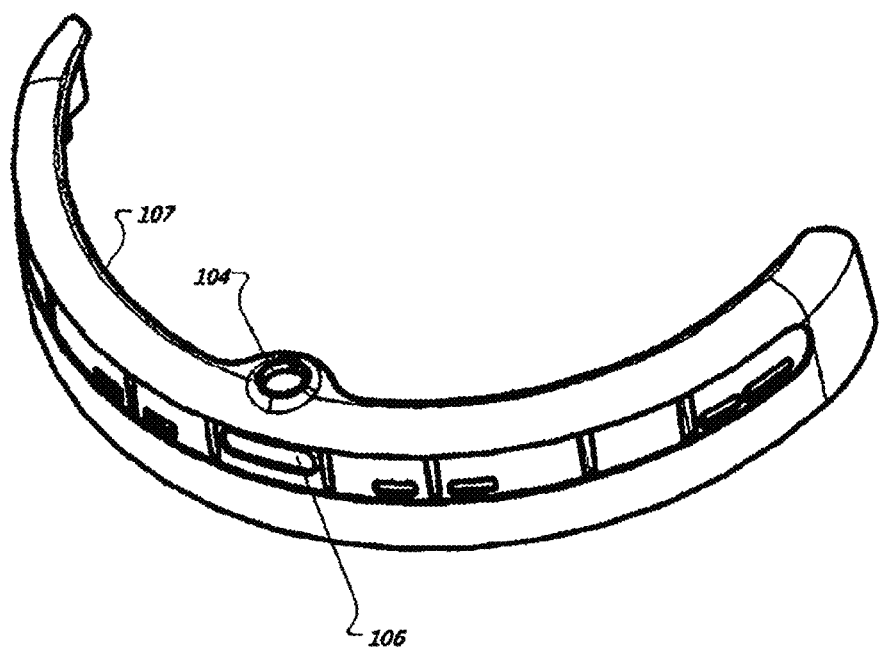
FIG. 2 illustrates the positions of omni-directional receiver and directional receiver on a bumper of an autonomous coverage robot in accordance with the present teachings.

FIG. 2 illustrates the positions of omni-directional receiver 104 and directional receiver 106 on the bumper 107 of the robot 100. Bumper 107 may also have other sensors (not shown) to aid the robot 100 as it navigates about its surroundings. For example, proximity sensors may be used to determine when an obstacle is close to the robot 100, contact sensors may be used to determine when the robot 100 has physically encountered an object, and cliff sensors may be used to sense when the robot 100 has encountered the edge of the floor, such as when it encounters a set of stairs.

Figure 3:
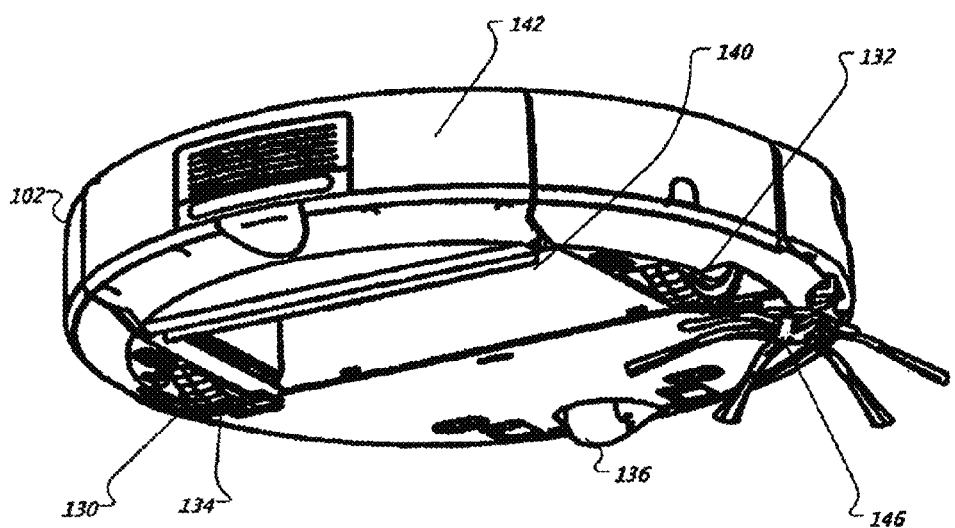
FIG. 3 shows a below-perspective view autonomous coverage robot in accordance with the present teachings.

FIG. 3 shows a below-perspective view of the autonomous coverage robot 100. A drive system 130 includes a first drive wheel 132 and a second drive wheel 134 which support chassis 102. A castor 136 may provide additional support to chassis 102. Motors may be mechanically coupled to the drive wheels to propel the robot 100, providing forward, reverse, and turning capabilities.

The robot 100 may have a floor cleaning system that removes dirt and debris from the floor as it maneuvers about. The floor cleaning system may include a floor cleaning assembly 140, a cleaning bin 142, a bin sensor (not shown), and a sweeping brush 146. The floor cleaning assembly 140, sweeping brush 146 and cleaning bin 142 may be carried by the chassis 102. Cleaning bin 142 may be arranged to collect debris removed from a floor being cleaned by cleaning assembly 140. The bin sensor may be configured to generate a signal that indicates whether the cleaning bin has been filled to a threshold. When the threshold has been reached, the controller may initiate a docking sequence with a base station (described below). Cleaning bin 142 may be accessed to empty its contents either manually or, in some implementations, the robot 100 may automatically empty cleaning bin 142 when docked.

A navigation beacon 150 (see FIG. 4) may be used in conjunction with existing walls or other obstacles to create a bounded area for robot 100. Bounding an area may be done, for example, to restrict a robot from entering or leaving an area. The navigation beacon 150, along with the robot 100 described above, form an example of an autonomous mobile robot system.

Figure 4:
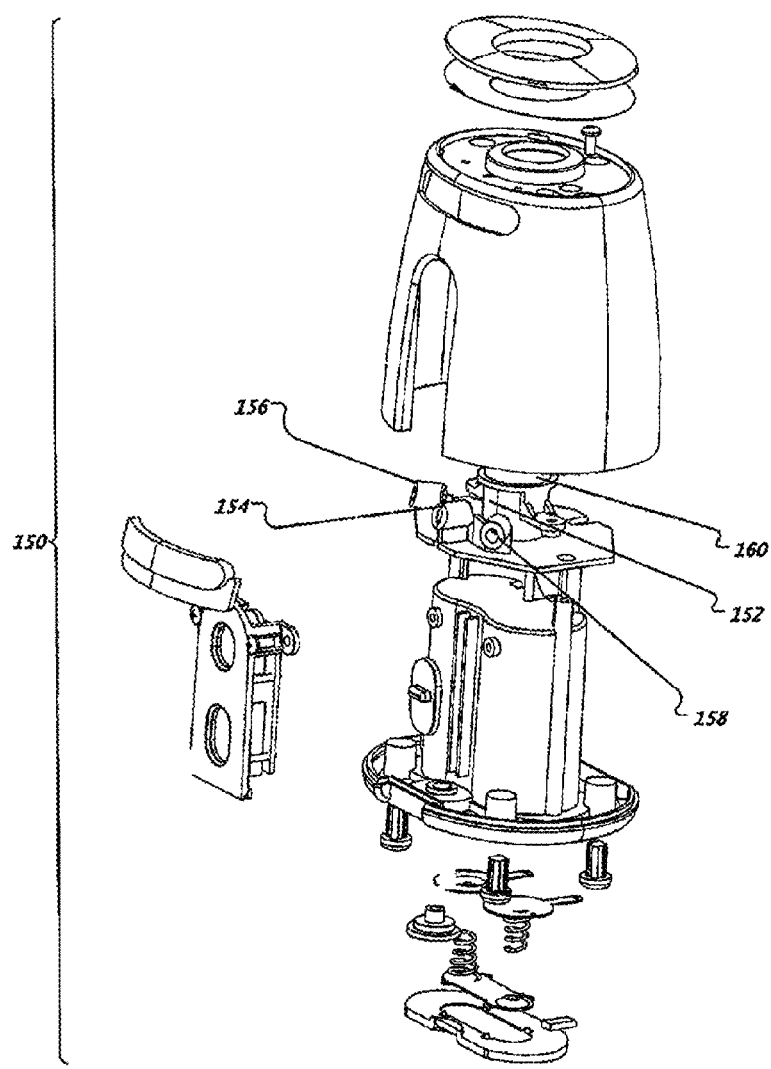
FIG. 4 shows an exploded perspective view of an exemplary navigation beacon including a first exemplary beacon emitter assembly in accordance with the present teachings.

FIG. 4 shows an exploded view of an example navigation beacon 150. Navigation beacon 150 has a beacon emitter assembly 152, which includes a gateway beacon emitter 154 and an omni-directional emitter 160. Gateway beacon emitter 154 may be arranged to transmit a gateway marking emission.

For instance, beacon 150 may be located within a gateway that separates first and second adjacent areas and may emit a gateway marking emission to form a boundary. Omni-directional receiver 104 and directional receiver 106 on the robot 100 may detect gateway marking emissions and thereby function as beacon emission sensors. For example, beacon 150 and the robot 100 may use infrared light (IR) emitters and sensors to create and detect the gateway marking emissions.

Navigation beacon 150 may transmit, via omni-directional emitter 160, a proximity emission laterally about itself. The proximity emission may be thought of as a "force field" through which the robot 100 is not permitted to pass. The robot 100 may avoid cleaning and migration within the proximity emission by executing a pre-configured behavior such as changing its course when the proximity emission is detected.

Beacon emitter assembly 152 includes a first directed vectoring beacon emitter 156 and a second directed vectoring beacon emitter 158. Directed vectoring beam emitters may be used to create an emission field with a characteristic edge and spread pattern that may be used to define a navigation route. Navigation beacon 150 may be located within a gateway between two bounded areas with vectoring beacon emitter 156 arranged to transmit a directed vectoring emission into the first bounded area. The angle between the directed vectoring emission and the gateway may be, for example, in the range of 45-90 degrees. In some instances, the directed vectoring emission may consist of infrared light.

Figure 5:
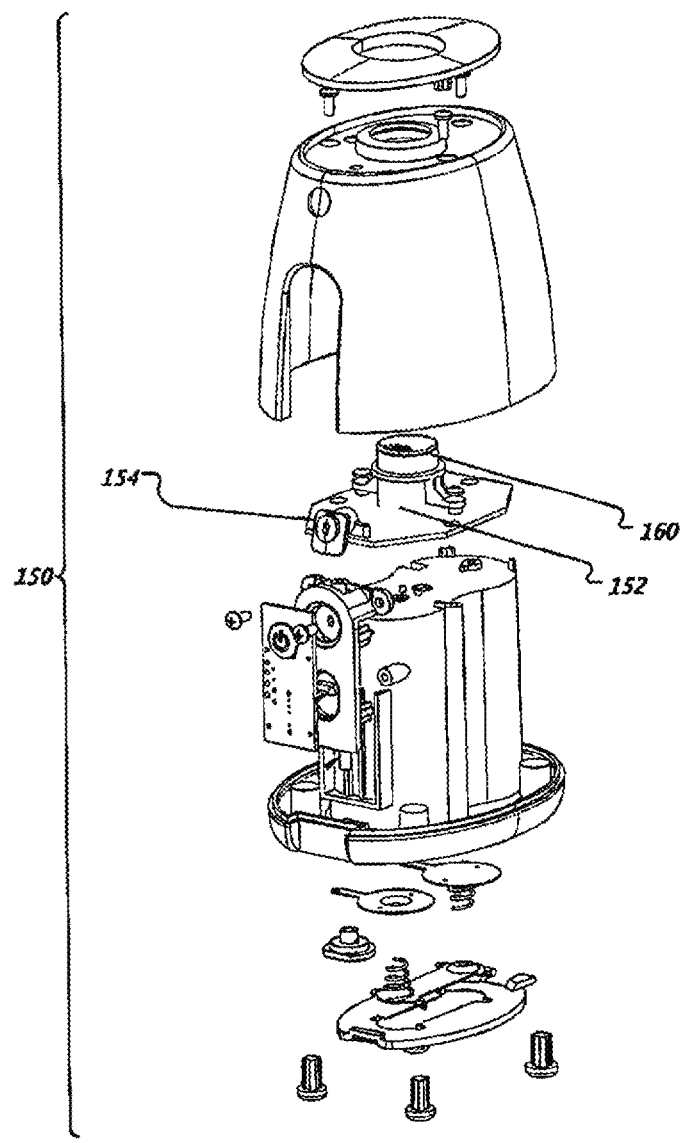
FIG. 5 shows an exploded perspective view of another exemplary navigation beacon including a second, simplified exemplary beacon emitter assembly in accordance with the present teachings.

FIG. 5 shows an example of a simplified navigation beacon 152 that may be used with an autonomous mobile robot navigation system. In this example, the beacon has a beacon emitter assembly 152 including a gateway emitter 154 and an omni-directional emitter 160, but does not have vectoring emitters. Such a beacon may be used to define boundaries of a region but not necessarily support migration functionality.

While in a cleaning mode, the robot 100 may remain in the first bounded area by changing its drive direction when it detects the gateway marking emission. The gateway marking emission thus acts as a virtual barrier which may prevent the robot 100 from leaving the first bounded area.

The robot and navigation beacons may communicate via point-to-point transmissions or via broadcast transmissions. In a point-to-point scheme, the robot would have to learn the identifiers of all of the navigation beacons. Then it could send transmissions with a data field indicating the destination navigation beacon. That navigation beacon and only that navigation beacon would respond accordingly. This has the advantage that only specific navigation beacons would respond, keeping other navigation beacons off and thus increasing their battery life. User interaction may be used to train the robot to know the navigation beacons.

The robot 100 may include a transmitter for communicating with beacon 150. The transmitter may be used to signal beacon 150 to halt or pause transmission of the gateway emission in the migration mode. By signaling beacon 150 to turn on its various emitters only when needed, the system may implement a power-saving function. Such a function may serve to extend battery life in beacon 150.

The robot 100 may be able to remotely activate and deactivate the beacon emissions. For example, the robot 100 may use wireless communication, such as radiofrequency (RF) communication, to pass activation and deactivation signals. The robot 100 may remotely activate the directed vectoring emission of the beacon 150 and deactivate the gateway emission upon initiating the migration mode. The robot 100 may remotely deactivate the directed vectoring emission of beacon 150 and activate the gateway emission upon terminating the migration mode.

In one example, the robot 100 controls the state of the navigation beams through commands transmitted over a packet radio network. The address that the beacons respond to on this network is a combination of a robot address and a node address. After installing batteries in the beacon 150, the beacon 150 periodically tries to contact any robot to see if it should wake up and operate its emitters. A robot 100 may respond by transmitting a radio packet containing an invitation to join its network and a temporary address to use. While operating with a temporary address, the beacon 150 transmits an infrared code in a fence beam from emitter 154 and force field beam from omni-directional emitter 160 indicating that it is not bound, i.e. its radio address is temporary. When a robot 100 sees a beam with the bound code, it iteratively transmits a radio packet to every recently assigned temporary address to send a new code in its beam called a wink. If the robot 100 sees a wink code, it transmits a radio packet containing a new node address to be used from now on as well as a time indicating the number of hours the address is valid for use. Having bound to a robot 100 successfully, the beacon 150 will henceforth only wake up in the presence of that robot 100. The technique of confirming radio communications using infrared light signals is designed to prevent a robot 100 that is not on the same floor as the beacon 150 from controlling it permanently.

In some instances, the drive system 130 may be configured to maneuver the robot 100 about the first bounded area in the cleaning mode for a preset time interval. When the preset time interval elapses, the drive system 130 may be automatically put in migration mode. While in migration mode, drive system 130 may be configured to maneuver the robot 100 across the gateway emission. In other instances, the drive system may be configured to maneuver the robot about the first bounded area in the cleaning mode until it encounters of the gateway marking emission a preset number of times. Once the gateway marking emission has been encountered the preset number of times, the migration mode may be automatically initiated.

While in migration mode, drive system 130 may be configured to direct the robot 100 toward beacon 150 when it encounters the directed vectoring emission emanating from vectoring beacon emitter 156. The robot 100 may then determine the position of the beacon 150 based on the detected direction of the directed vectoring emission relative to directional receiver 106. Once position is determined, the robot 100 may align itself in a drive direction relative to the directed vectoring emission. For example, the robot 100 may advance forward along the path of the directed vectoring emission to reach and traverse the gateway in which beacon 150 is located. In some instances, there may be objects positioned within a bounded area that an owner of the robot prefers not to move. Examples of such objects include containers such as pet dishes for containing food or water, fragile objects, and planters holding live plants. A navigation beacon 150 may be used only to identify or bound an area which contains such objects, preventing the robot 100 from getting too close to such objects. For example, the navigation beacon 150 may be placed near or adjacent to an item to be protected from or avoided by robot 100. Any item that is placed within the range of the proximity emission transmitted by omni-directional emitter 160 will be within the "force field" projected by navigation beacon 150 and, thus, protected from robot 100.

According to the present teachings, a cover 300 (see FIG. 6) may be provided to block infrared transmissions from gateway emitter 154 (and any other directional emitters) of navigation beacon 150. Blocking the infrared transmissions from gateway emitter 154 on navigation beacon 150 will prevent robot 100 from aligning itself in a drive direction relative to the directed vectoring emission and advancing forward to the gateway in which beacon 150 is located. Additionally, cover 300 may be configured to permit infrared transmissions from omni-directional infrared emitter 160. Permitting transmission of an infrared signal from omni-directional infrared emitter 160 while preventing transmission from gateway emitter 154 will permit navigation beacon 150 to simply be used as a "force field" or a deterrent, to prevent robot 100 from approaching an object placed within range of the omni-directional infrared emitter 160.

Cover 300, or at least a portion thereof, is made from a material capable of blocking infrared transmissions or the type of transmission emitted by at least directional emitters of the navigation beacon. Additionally, the material may be capable of providing protection to navigation beacon 150, for example, it may shield navigation beacon 150 and its electronic systems from water and other environmental hazards. For example, cover 300 may be made from a black silicone material having sufficient thickness to absorb the infrared light emitted by gateway emitter 154. Such a material would also provide protection against liquid spills, for example, when navigation beacon is used in proximity to a pet's water dish. As will be understood by one of ordinary skill in the art, other suitable materials may be used.

Figure 6:
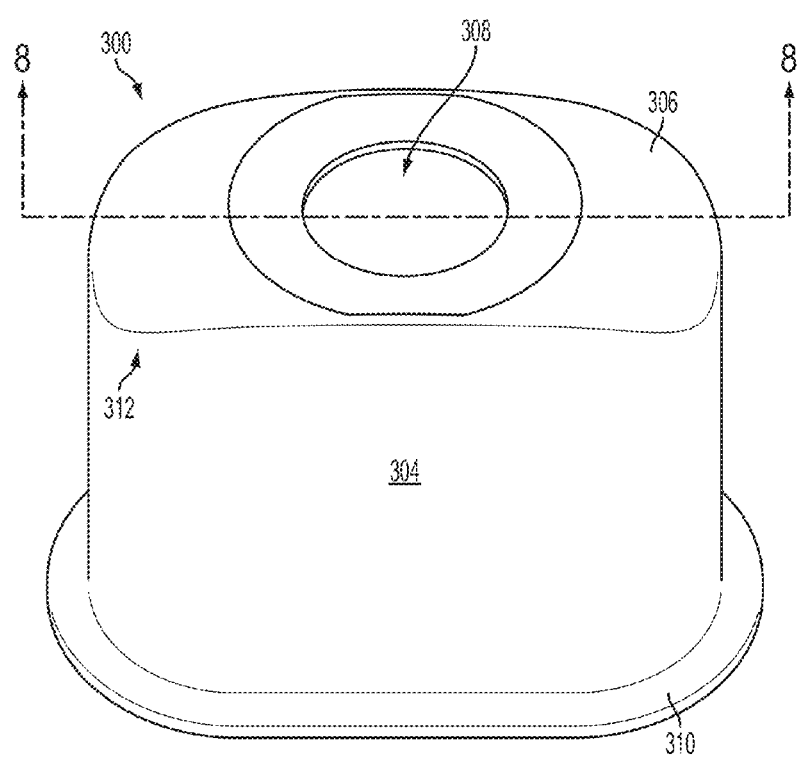
FIG. 6 is a front perspective view of a cover structure to be used with the autonomous mobile robot system in accordance with the present teachings.
Figure 7:
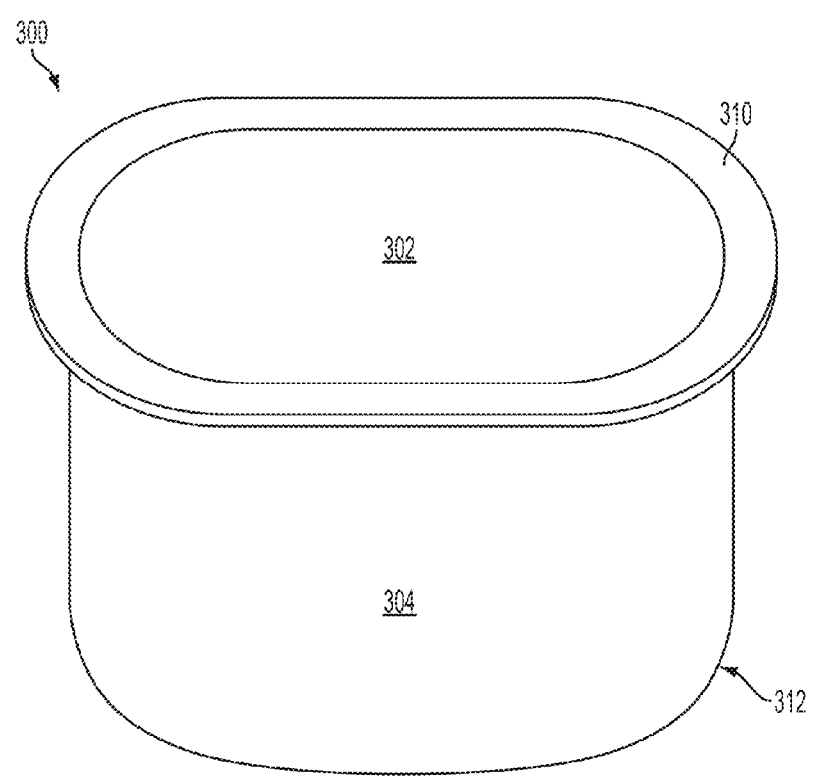
FIG. 7 is a below-perspective view of the cover structure of FIG. 6.

As illustrated in FIGS. 6 and 7, cover 300 may be sized to receive navigation beacon 150 and extend from a top of navigation beacon 150 to a support surface on which navigation beacon 150 sits, such as a floor or a mat. The illustrated exemplary cover 300 includes an open bottom 302, a wall portion 304, a top portion 306, and an opening 308. Open bottom 302 is configured to receive navigation beacon 150, surround a base of navigation beacon 150, and rest on the support surface. Open bottom 302 may be surrounded by an extended edge or base portion 310. Base portion 310 may be formed integrally with open bottom 302 and wall portion 304 and may provide stability to cover 300. Wall portion 304 is configured to extend along a length (height) of navigation beacon 150 and to surround a body of navigation beacon 150. Wall portion 304 is configured to block infrared transmissions from directed emitters of navigation beacon 150 such as, for example, gateway emitter 154, thus preventing reception of such transmissions by robot 100. In certain embodiments of the present teachings, wall portion 304 may have a uniform thickness. Alternatively, portions of wall portion 304 configured to block infrared may be thicker than other parts of wall portion 304. One skilled in the art will understand that cover 300 need not completely surround navigation beacon 150; however, surrounding navigation beacon 150 can provide certain protection for navigation beacon 150.

As shown in FIG. 6, a top portion 306 of cover 300 includes an opening 308. Opening 308 is configured to permit and avoidance signal emitter, for example omni-directional emitter 160 of navigation beacon 150, to protrude from cover 300 (or otherwise not have its signal blocked by cover 300) such that a signal transmitted by omni-directional emitter 160 of navigation beacon 150 is not impeded by cover 300. In this manner, navigation beacon 150 may transmit a proximity emission or "force field" to prevent robot 100 from entering within the area encompassed by the force field.

The opening 308 in the top portion 306 of cover 300 may be sized to fit around a base of omni-directional emitter 160 and it may be shaped to provide clearance around the emitter 160. The top portion 306 of cover 300 extends from opening 308 toward wall portion 304. Top portion 306 may slope away from the opening 308 to a shoulder portion 312. Shoulder portion 312 joins top portion 306 with wall portion 304. Top portion 306, shoulder portion 312, wall portion 304, and base portion 310 may be integrally formed.

Figure 8:
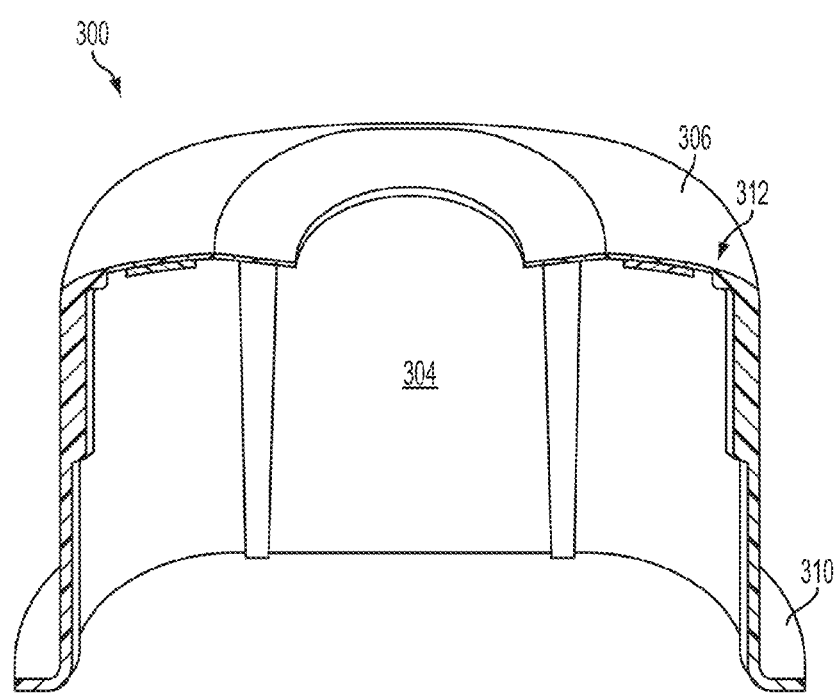
FIGS. 8 and 9 are cross-sectional views of the cover structure of FIG. 6 taken along lines 8-8 and 9-9 respectively.
Figure 9:
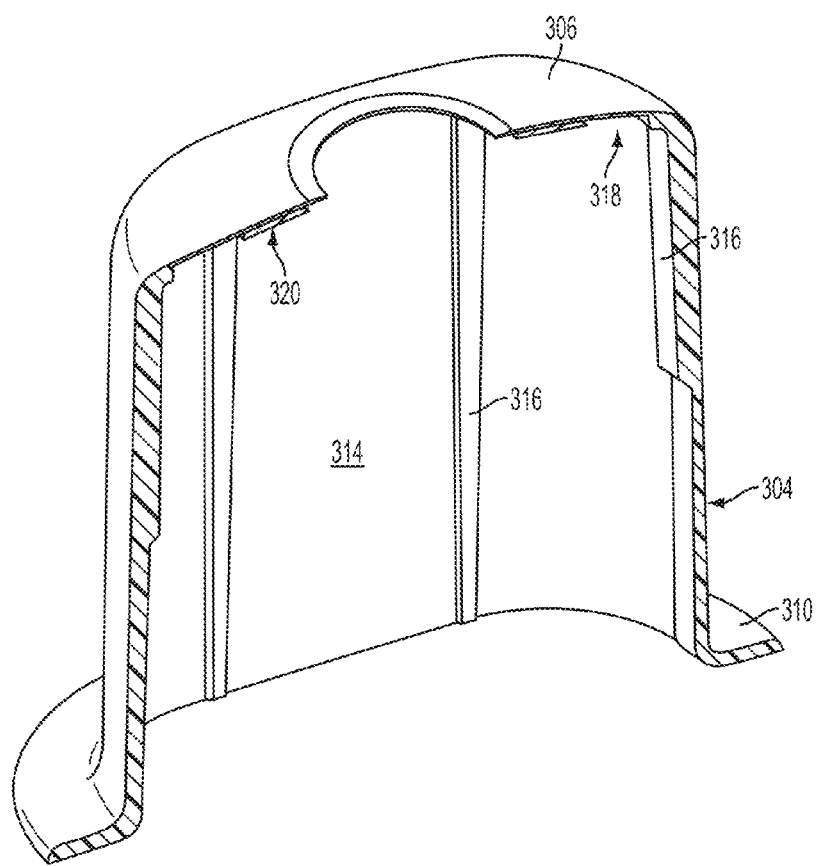

Additionally, as shown in FIGS. 8 and 9, in certain embodiments of the present teachings, an interior portion of cover 300 may be provided with structure to guide and align the position of the cover with respect to navigation beacon 150. For example, an interior surface 314 of wall portion 304 of cover 300 may include a plurality of ribs 316. As shown in FIG. 9, ribs 316 may extend, e.g., substantially vertically, along a length of wall portion 304. Additionally or alternatively, ribs 316 may extend along only a portion of wall portion 304. Ribs 316 may be configured to align wall portion 304 of cover 300 relative to gateway emitter 154 of navigation beacon 150. Ribs 316 may be integrally formed with wall 304. In accordance with certain embodiments, an interior of the top portion 306 of cover 300 also may be provided with alignment elements. For example, the interior surface 318 of top portion 306 may include structure such as button reliefs 320 to provide alignment between opening 308 and emitter 160. Other suitable alignment structures also may be used.

Figure 10:
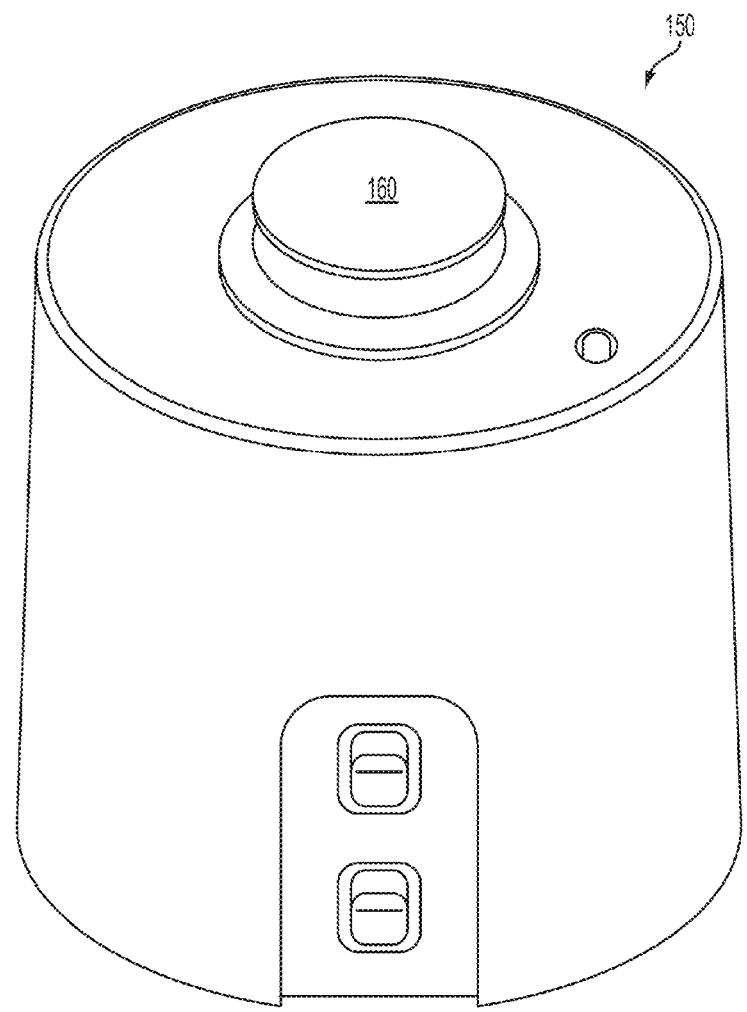
FIG. 10 is a perspective view of a navigation beacon to be used with the cover structure of the autonomous mobile robot system in accordance with the present teachings.
Figure 11:
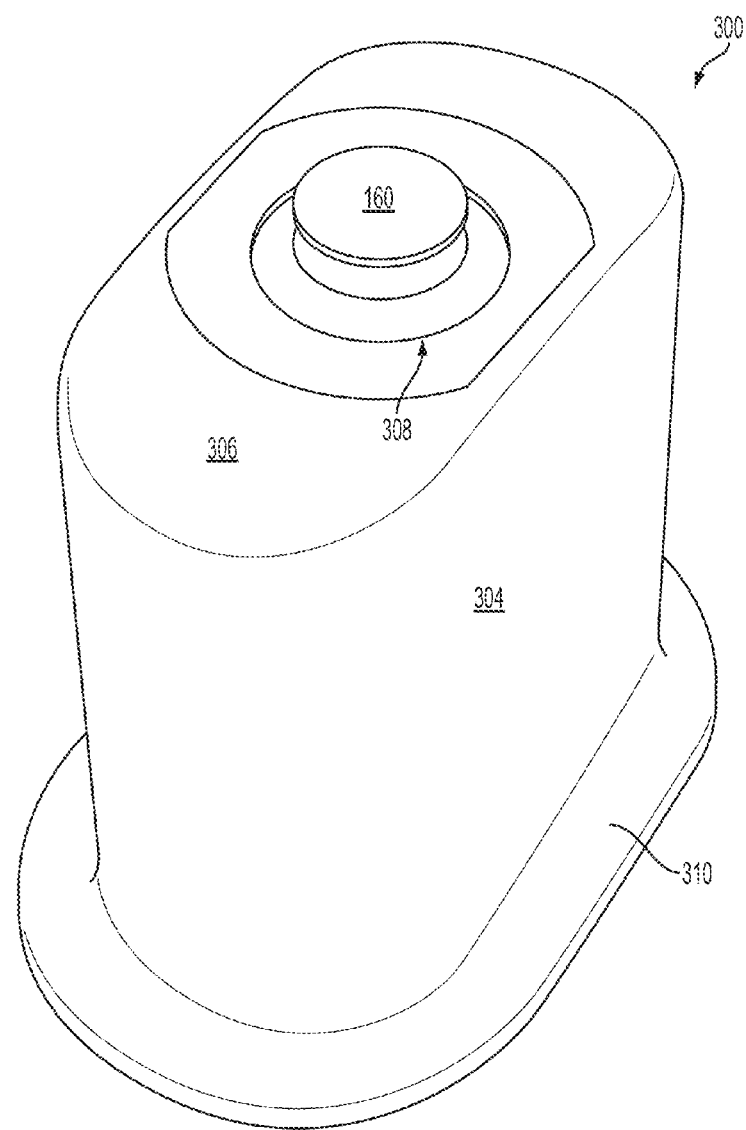
FIG. 11 is a perspective view of a cover structure positioned on a navigation beacon in accordance with the present teachings.
Figure 12:
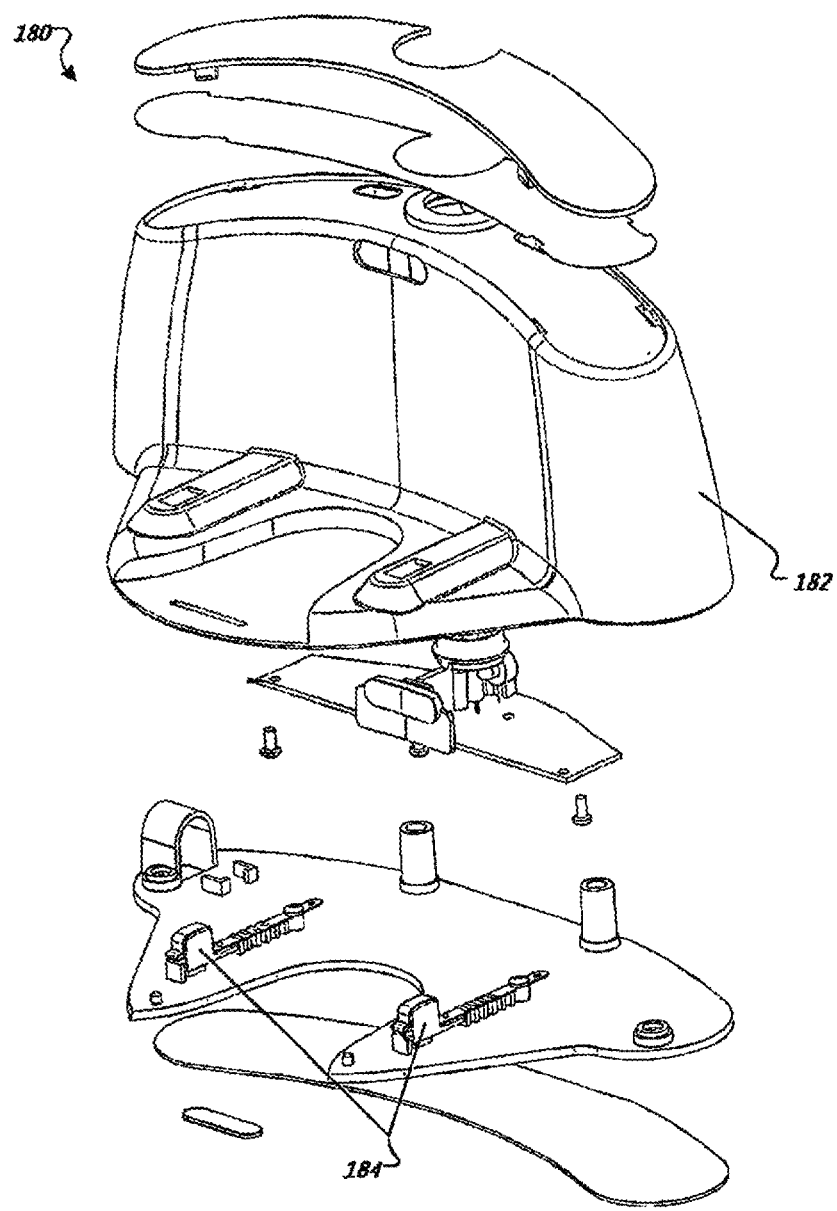
FIGS. 12-15 show various views of an example base station that may be included in the autonomous mobile robot system in accordance with the present teachings.
Figure 13:
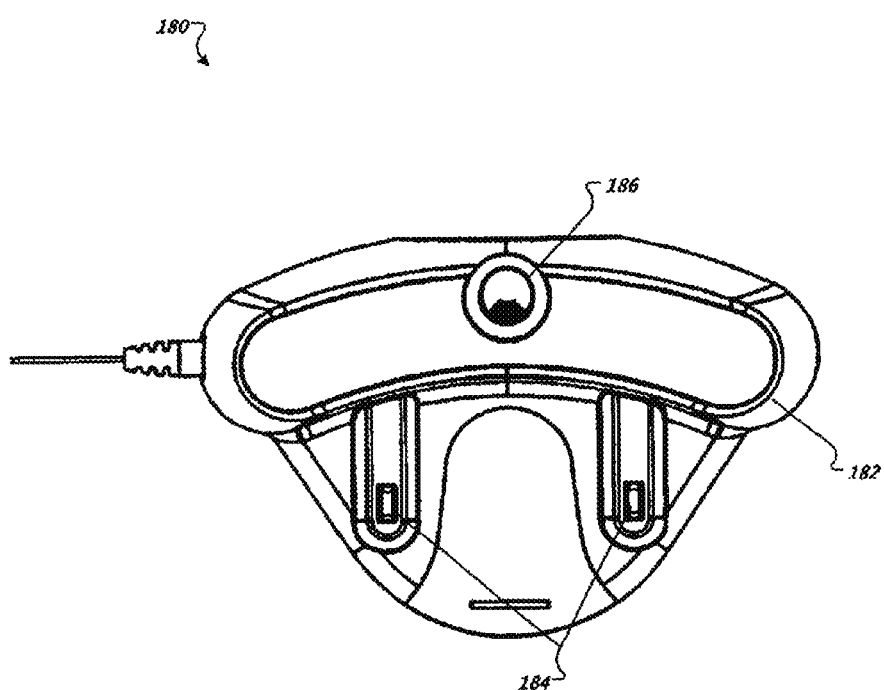
Figure 14:
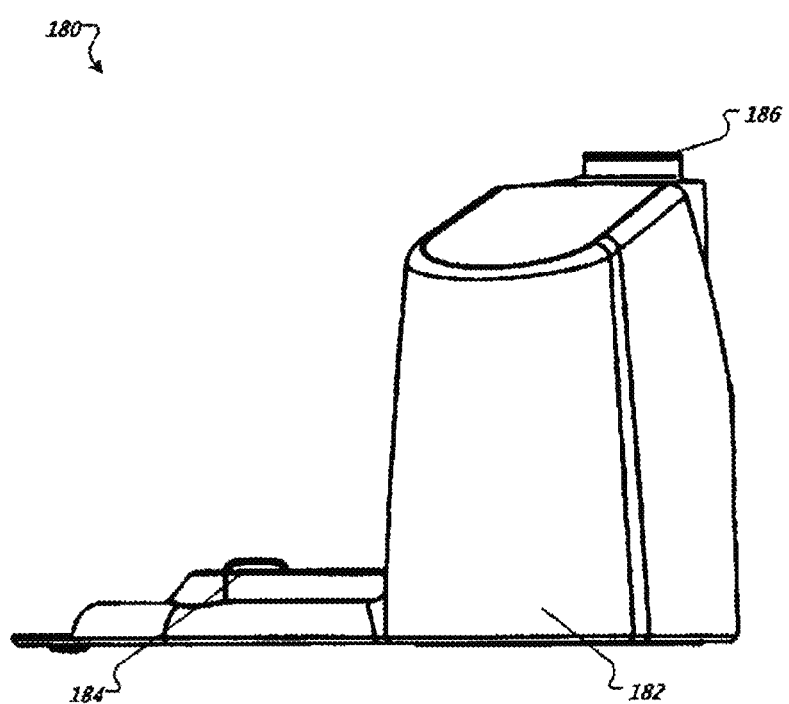
Figure 15:
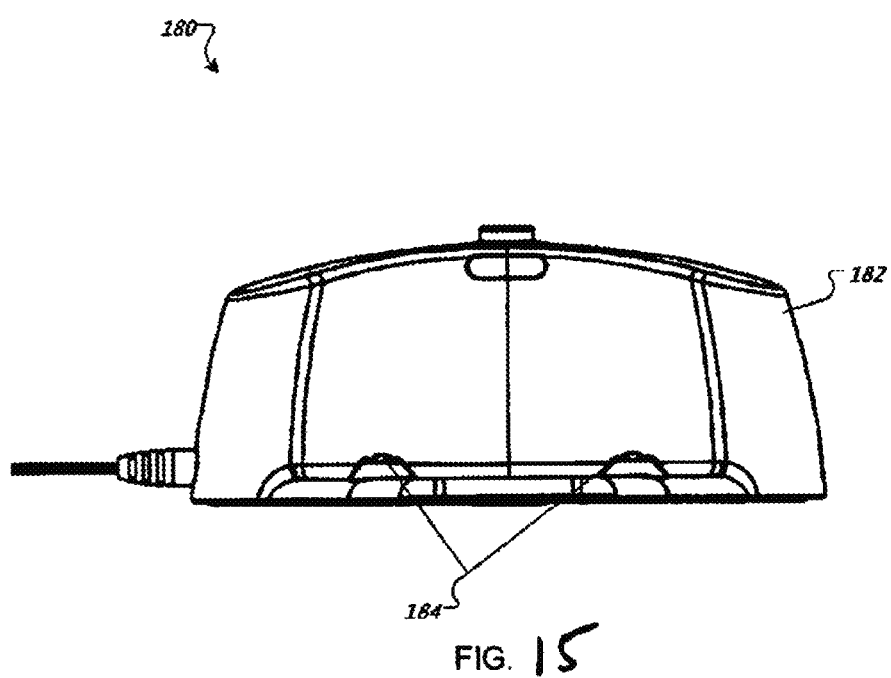

FIG. 10 is a perspective view of an exemplary navigation beacon configured to receive cover 300. As illustrated in FIG. 11, cover 300 substantially completely covers the body of navigation beacon 150, including any directional emitters 154. The omni-directional emitter 160 that extends above the body of the navigation beacon 150 extends through opening 308 in the top portion 306 of cover 300, such that omni-directional emitter 160 is not contained within cover 300.

In accordance with one embodiment of the present teachings, a visual identification element (not shown) may be provided to allow a user to identify a radius of an area within which navigation beacon 150 provides a force field, preventing the robot 100 from getting too close to objects positioned within the radius. An example of a visual identification element includes a circular mat, having a radius substantially equal to an outer limit of a range of the signal emitted by omni-directional emitter 160. In such a case navigation beacon 150 may be centered within the mat, and objects to be "protected" or avoided by robot 100 may be placed on the mat. Alternatively, the mat may have a diameter equal to the outer limit of the range of the signal emitted by omni-directional emitter 160, allowing navigation beacon 150 to be positioned on a perimeter of the mat while objects to be "protected" or avoided by robot 100 may be placed on the mat. The mat may be, for example, made of a rubber material, or a non-slip or non-skid material. As will be evident to one of ordinary skill in the art, the mat may take on different shapes and may be made of any suitable material. Additionally or alternatively, the visual identification element may be any other suitable structure that provides a visual indication of the boundaries within which objects are protected from robot 100 due to the signal emitted from omni-directional emitter 160.

FIGS. 12-15 show various views of an example base station 180 that may be included in the autonomous mobile robot system. Base station 180 may be located in a bounded area served by the system. Base station 180 has a base 182 with a defined docking direction and a robot charger 184. The robot 100 may approach base 182 from the docking direction to dock with the base 182. The robot charger 184 is housed in the base 182 and may be used to charge the robot 100 when it is properly docked.

The robot charger 184 may begin operating when triggered by a detection circuit after the robot 100 is docked to base 182. In accordance with various embodiments, battery conditions may be used to govern whether a deeply discharge mode, a pre-charge trickle mode, or a post charge trickle mode is used to charge the battery.

Figure 16:
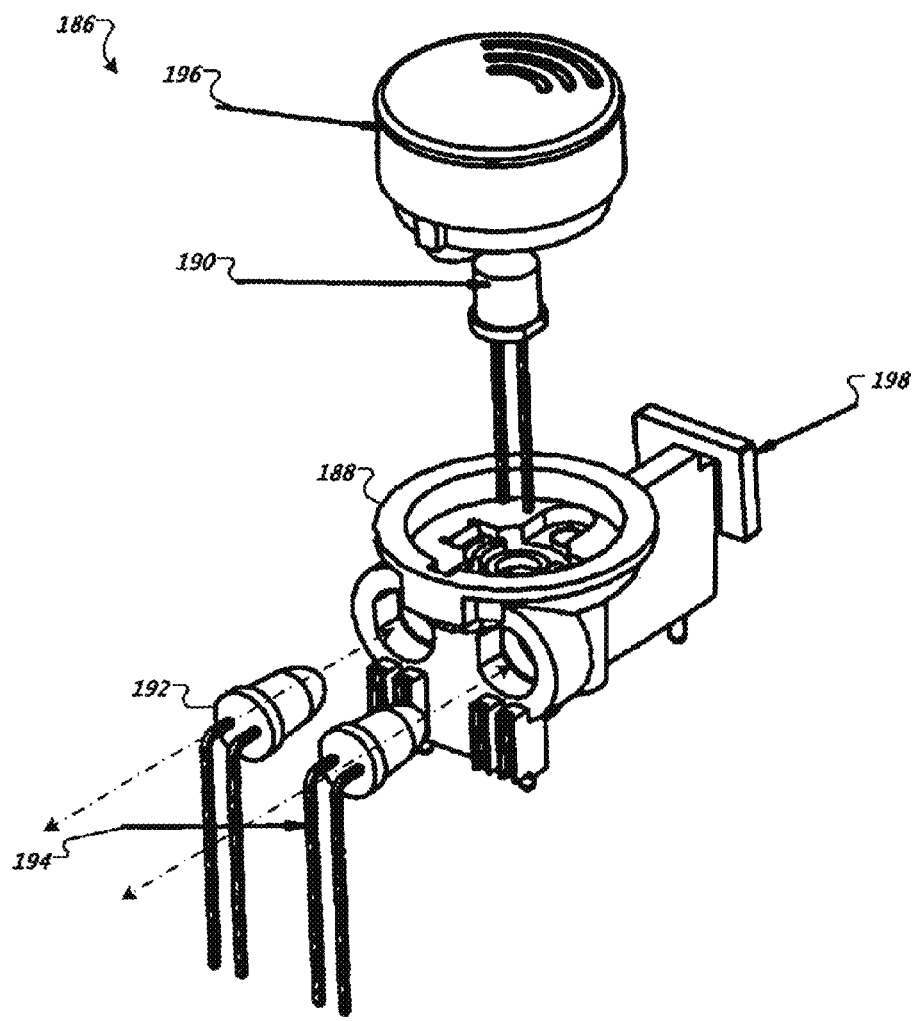
FIG. 16 shows a perspective view of an example emitter assembly to be used in a base station of the autonomous mobile robot system in accordance with the present teachings.

FIG. 16 shows a perspective view of an example emitter assembly 186 used in base station 180. Emitter assembly 186 has a lower housing 188 which holds an omni-directional beam emitter 190 and two navigational field emitters 192 and 194.

The omni-directional emitter 190 may be mounted on housing 188 and be configured to project a proximity beam laterally around the docking station through the use of an upper housing 196. Upper housing 196 may be configured such that emissions from omni-directional emitter 190 form a desired pattern outside base 182, such as a circle.

Navigational field emitters 192 and 194 may be attached to lower housing 188 and arranged to emit respective, laterally bounded and overlapping fields of emissions of signal beams. One of the emitted fields may define a lateral field edge aligned with the docking direction and be overlapped by the other emitted fields. The two navigational field emitters of the base station may be positioned such that their angle 30 of overlap may be about 6 degrees and each emitter's aperture angle may be 20-30 degrees. A projection 198 on lower housing 188 may be used to shape the emissions from emitters 192, 194 to achieve the above pattern. In one example, the navigational field emitters 192 projects a beam at about 12 degrees from a direction normal to the emitter assembly 186, where the beam sweeps about 40 degrees starting from about −5 degrees to about 35. The other navigational field emitters 194, with the L-shaped baffle or mask 198 terminating near the middle of the LED, projects a beam at about 12 degrees from a direction normal to the emitter assembly 186, where the beam sweeps from straight out to about −35 degrees. In some implementations, the emission fields may consist of infrared light (IR). In such cases, field emitters 190, 192, and 194 may consist of infrared light emitting diodes (LEDs).

Figure 17:
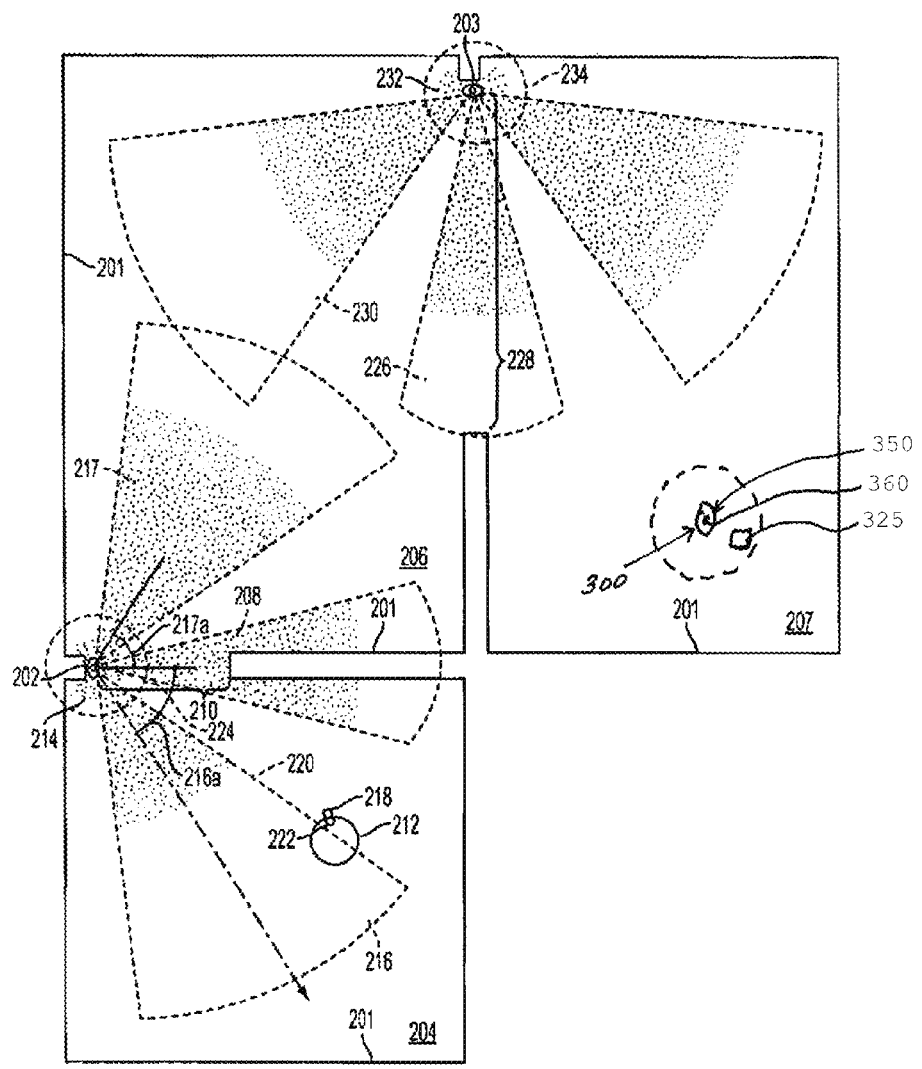
FIG. 17 shows a first example of applying of a method of navigating an autonomous coverage robot between bounded areas using navigation beacons with the addition of a base station.
Figure 18:
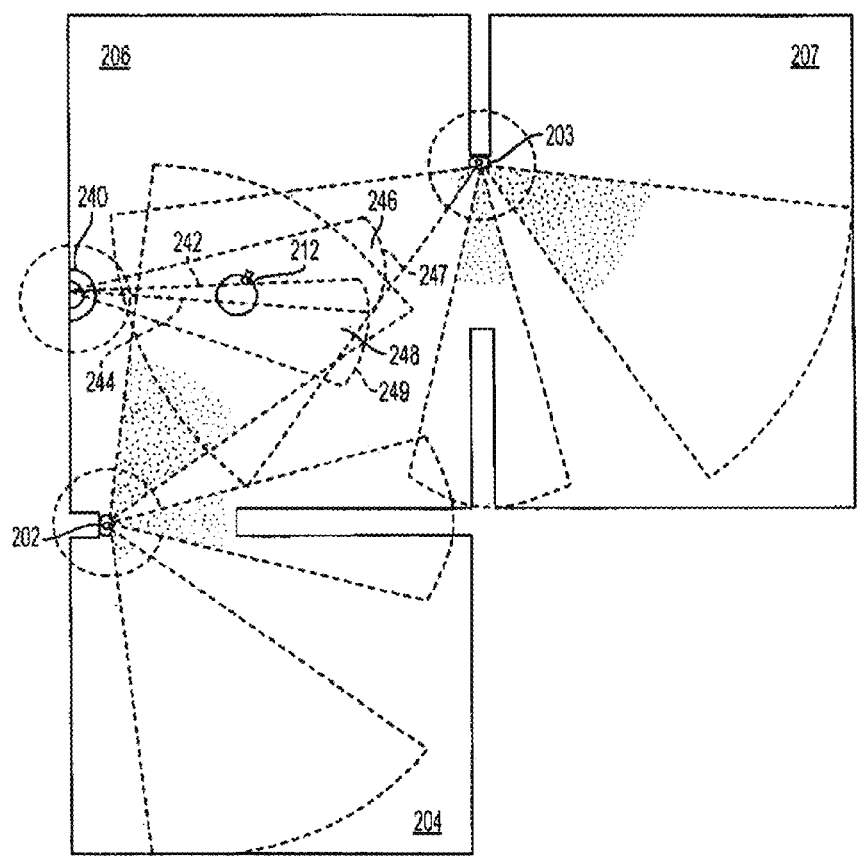
FIG. 18 shows a second example of applying of a method of navigating an autonomous coverage robot between bounded areas using navigation beacons in which the robot encounters more than one beam at the same time.

FIGS. 17 and 18 show an example of applying of a method of navigating an autonomous coverage robot between bounded areas using navigation beacons. The method may be applied to a system such as the example the robot navigation system described above. While the following description relates a particular software architecture and set of algorithms to the navigation beacons disclosed as a physical infrastructure, the very same embodiments of a robot, control and software architecture, and/or many particular algorithms can be used with a different physical infrastructure.

Accordingly, because the manner and methods by which the robot handles sequences of goals and navigation are relatively independent of the actual physical form of the infrastructure, for discussions involving such manner and methods, "navigation beacon" includes active and passive landmarks of other physical kinds (e.g., bar codes, retro-reflective tags, illuminated or IR spots projected on the ceiling or walls, directional RF or visible light, and other features identifiable in the environment), and "beam" includes directed vectors of other physical kinds (including inferred directional vectors calculated or kept in memory that may be followed, as well as line-of-sight directions to distant observed objects). In the example shown in FIGS. 17 and 18, walls 201, a first navigation beacon 202 and a second navigation beacon 203 define a first bounded area 204, a second bounded area 206, and a third bounded area 207 (which are typically rooms of a home). Navigation beacon 202 may be configured to transmit a gateway marking emission 208 (also noted herein as a "virtual gateway" or "gateway beam") across a gateway 210 (typically a doorway, but openings of a few feet to 10 or 12 feet are possible, as well as arbitrary segmenting of a room without any particular openings). The gateway marking emission 208 may be an IR signal, for example, which can be sensed by a coverage robot 212.

The robot 212 may be placed within a bounded area 204. The robot 212 may autonomously traverse the bounded area 204 in a cleaning mode. If the robot 212 encounters gateway marking emission 208 in gateway 210, the robot 212 remains in the bounded area 204 without moving into an adjacent bounded area 206. Upon termination of the cleaning or coverage mode in the first area, the robot 212 may autonomously (i.e., in response to an internal trigger condition as discussed herein, e.g., time expired, distance covered, percent covered) enter a migration mode in which the robot continues cleaning but monitors for the gateway 210, locates a gateway 210, moves to and through gateway 210, (past beacon 202), into the adjacent bounded area 206.

In some implementations, the robot 212 may autonomously enter the cleaning mode after the migration to bounded area 206 has been completed. While in the migration mode, the robot 202 may be non-responsive to gateway emission 208 (although the robot may record having crossed the gateway emission 208). In some cases, the robot 212 may remotely (i.e., by direct or relayed RF communications or line-of-sight or reflected optical signaling) deactivate gateway marking emission 208 upon entering migration mode. The robot 212 may also activate gateway marking emission 208 after exiting the migration mode.

Furthermore, navigation beacon 202 may transmit a proximity emission or field 214 laterally around (surrounding) itself, establishing an exclusion zone or "force field". The robot 212 may detect this proximity field and use the detection to attempt to avoid maneuvering within the exclusion zone around a beacon 202 while in the cleaning or migrating modes. The primary purpose of the exclusion zone is to prevent the robot 202 from striking the beacon 202 and moving it.

Navigation beacon 202 may be configured to transmit a first directed vectoring emission 216 (also discussed herein as a "directed emission," "directed beam," "launch beam" or "tractor beam") into bounded area 204 and a second directed vectoring emission 217 into bounded area 206, with beacon 202 positioned within gateway 210. For example, the robot 212 may drive toward beacon 202 upon detecting directed emission 216 while in the migration mode.

While in the migration mode, the robot 212 may detect the directed emission 216 by sensing the directed emission 216 with a directional receiver 218 (also discussed herein as a "binocular sensor," e.g., including twin detectors in collimated tubes) located on the front of the robot 212 (i.e. the side of the robot 212 that is aligned with the forward the robot drive direction). Alternatively, the robot 212 may sense the directed emission 216 with an omni-directional receiver 222 prior to detection by directional receiver 218. The term "omni-directional receiver" as discussed herein includes non-directional and multi-directional receivers, e.g., receivers including two or more sensors (at compass points, etc.) directed about the periphery of the robot. The robot 212 may use the signal detected by omni-directional receiver 222 to then maneuver (turn in place or turn going in forward or reverse directions) to sense directed emission 216 with directional receiver 218. The robot 212 may align its direction of travel with a path defined by an edge 220 of directed emission 216. Directional and omni-directional receivers 218 and 222 may have construction and function similar to that described above.

In some cases, the robot 212 may move towards the beacon 202 along the emission path (i.e., servoing using the two beam detectors 114 and 116 of the binocular sensor 106) until it senses a beacon perimeter 224 (i.e. the edge of proximity field emission 214). The robot 212 may move along beam perimeter 224 through the gateway 210 and into bounded area 206. The angle between the gateway emission 208 and directed emission 216 may, in some instances, be between about 45 and 90 degrees, and optionally is about 60 degrees. The gateway emission 208 is sized according to the robot diameter, and diverges to be approximately the width of the robot at the proximity field edge or range of detection (e.g., to prevent the robot crossing at that point). This may be a span of 10 degrees or more, but is determined by the robot diameter. The angle between the center of the gateway emission 208 and the center of each directed emission 216 is, in two different examples, about 45 degrees or about 60 degrees, and each directed emission 216 beam is a diverging beam made diffuse by the slot mask near the emitter, and is, in two different examples, about 20-30 degrees (e.g., 25 degrees) or about 30-50 degrees (e.g., 40 degrees). In some instances, the directed emissions 216 and 217 may consist of infrared light.

The robot 212 may remotely activate and/or deactivate emissions coming from beacon 202, such as directed emission 216 or gateway emission 208. Various methods may be used to transmit signals between the robot 212 and the navigation beacons 202 and 203.

In particular, it is effective to use the same inexpensive, common IR-LED emitters for each of the emitters of each of the beacons 202, 203, and in addition for a recharging or other dock 240 for the robot 212. The same sensors on the robot 212 can detect all of the emitters; and different sensors on the robot 212 (e.g., the multi-directional as well as the collimated directional sensors) can detect the same emitters for different purposes (as discussed herein, e.g., following, homing, stopping). In order to differentiate between the different emitters, each emitter may be encoded (e.g., modulated with a different serial code). This also helps avoid confusion with household and other remote controls as well as IR components of sunlight and other ambient sources. However, as shown in FIG. 18, the robot 212 can encounter situations in which it is traveling through the emission paths of several different emitters.

In this situation, especially when using optical multi-directional receivers or a common optical omni-directional receiver (but also in other instances, e.g., RF) the sensor or software structure is configured to be capable of discerning one emitter from another when several signals are simultaneously received. If different frequencies are available, then these may be employed. One strategy is for the emitters to take turns, being synchronized by their communications with the robot or each other. However, this is complex and introduces a failure mode when synchronization breaks down. It is advantageous for each beacon 202, 203 and dock 240 to self-control, and stagger their own signals in time, with intervals between each emission. For instance, each transmitted emission may be differentiated by time division multiplexing (i.e., multiplexing as the beam origins are taken together as a system, including within a beacon having more than one beam or among several beacons) with a fixed period random offset (e.g., which may be different for each beam source). The interval or random offset may be changed from time to time (e.g., at random intervals) or by communication with the robot (e.g., by RF communication when the robot detects an interference condition). At manufacture, or upon changing offset, e.g., the offset may be selected from a set of offsets unlikely to harmonically interfere, or that do not share common factors. In this manner, the robot may encounter several emission paths at once yet discern the identity of each. In other instances, each transmitted emission may be differentiated by different wavelengths of light, infrared modulations, and wavelength filters/windows on the emitters and receivers.

The robot 212 may use RF communication to signal to beacon 202 to remotely activate directed emission 216 and deactivate gateway emission 208 upon initiating the migration mode. In another example, the robot 212 may remotely deactivate the directed vectoring emission 216 and activate gateway emission 208 upon exiting the migration mode.

In some instances, the robot 212 may activate a gateway emission 226 separating bounded areas 206 and 207 and initiate the cleaning mode. Similarly to that described above, the robot 212 may be prevented from leaving bounded area 206 when it encounters gateway emissions 208 and 226. When finished cleaning in bounded area 206, the robot 212 may initiate the migration mode and navigate through gateway 228 by following directed emission 230 to a perimeter 234 of a proximity emission 232 and enter bounded area 207. Once in bounded area 207, the robot 212 may re-enter the cleaning or working mode. After, for instance, a set time period or preset number of encounters with gateway emission 208, the robot 212 may migrate from bounded area 204 to bounded area 206.

It should be noted that in all instances herein, the robot's behavior system is arranged such that obstacle events, including cliff detection events, have a higher priority than any room-to-room navigation or cleaning. Accordingly, for example, when the robot encounters a cliff detection in the middle of a navigation or other set of sequenced behaviors, the robot may nonetheless avoid the cliff (aborting the current part of the sequence and resetting the state of the sequence).

In any of the above scenarios, an object or container, such as a pet dish or a planter 325 may be positioned in one of the bounded areas in which robot 212 is moving. In order to protect the object or container, an additional navigation beacon 350 may be provided. Navigation beacon 350 is positioned near object 325 such that object 325 is within range of an omni-directional infrared emitter 360 of navigation beacon 350 Navigation beacon 350 is provided with a cover 300, as described above, such that emissions from directional gateway emitter 354 are blocked and cannot be received by robot 212. Cover 300 is positioned over navigation beacon 350 such that a body portion, including wall portion 304 of the cover 300, blocks infrared emissions from directional gateway emitter 354. Further, when the cover 300 is positioned on navigation beacon 350, the omni-directional infrared emitter 360 of navigation beacon 350 extends through an opening 308 in a top portion 306 of cover 300, permitting infrared emissions from omni-directional infrared emitter 360 of navigation beacon 350 Thus, cover 300 blocks infrared transmissions between at least one directional infrared emitter of the navigation beacon 350 and a directional receiver of robot 212 while simultaneously permitting infrared transmissions between the omni-directional infrared emitter 360 of navigation beacon 350 and an omni-directional receiver of the robot 212. In such a manner, navigation beacon 350 acts to project a force field around objects within in its range, preventing robot 212 from approaching and/or contacting the objects 325.

FIG. 18 shows a set of rooms, arranged with a base station, to illustrate the situation in which the robot encounters multiple beams from two beacon emitters and also from a dock 240. Using the strategies avoiding beam confusion noted above, the robot 212 may nonetheless navigate from room to room or the robot 212 may autonomously initiate a docking mode to maneuver towards the base station 240 in bounded area 206 and dock with the station upon termination of the migration mode in the second area.

The base station 240 may include a base, a robot charger, an omni-directional beam emitter and two navigational field emitters and be similar to the base station 180 described above. The robot 212 may maneuver towards base station 240 by detecting and advancing along one of the lateral field edges 242 or 244 of the overlapping fields 246, 248 aligned with the docking direction until docked with the station 240.

The robot 212 may detect the emissions of base station 240 with omni-directional receiver 222 on the robot and maneuver to detect an outer lateral field edge (e.g. 247) of at least one field emission 246 or 248. The robot 212 may then advance along outer lateral field edge 247 or 249 to the aligned lateral field edge 242 or 244 of the overlapping fields. Upon detecting the aligned lateral field edge 242 or 244, the robot 212 advances along the aligned lateral field edge 242 or 244 until docked with base station 240.

Referring to FIGS. 17, 18, and 19A-E, the docking behavior priorities (from highest to lowest) include docking retry docking bump follow 264c, docking bounce 264d, docking quick turn 296c, docking distant homing 296b, docking lobe following 296a, and docking field following 296d. The robot 402 must generally approach the dock 440 from a forward direction with less than 4 degrees of skew in order to dock properly.

Figure 19A:
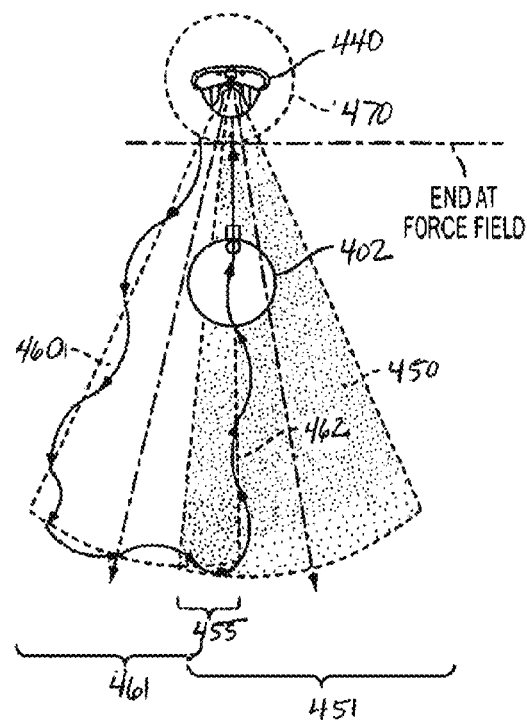
FIGS. 19A-E show schematic views of a robot docking with a base station.

The default docking behavior, docking lobe following 296a, as shown in FIG. 19A, is executed when no other docking behavior has a higher priority. When the robot 402 detects the left (red) beam 450 only, it follows the edge of the red beam 450 in a clockwise direction. When the robot 402 detects the right (green) beam 460 or the overlap area of the red and green beams 450 and 460, respectively, it follows the edge of the green beam 460 in a counterclockwise direction. This results in the robot 402 appearing to follow the outside of the nearest docking beam 450 or 460 around to the front of the dock 440 at zero degrees and then following a normal (zero degree) edge 462 right onto the docking contacts. When the robot 402 detects the force field 470 during this behavior it slows down in order to follow more accurately.

The robot 402 keeps track of the signals detected by the omni-directional receiver 422 over a window of 30 seconds. When the robot 402 detects that the frequency and variance of line crossing events (crossing the normal (zero degree) edge 462 is above about 1 Hz and below a variance of about 2.5 seconds it determines that the robot 302 is following the normal (zero degree) edge 462 and will simply drive straight by executing a smooth homing behavior, instead of continuing to follow the edge 462 (with the inevitable right-left oscillation) under the lobe following behavior 296a.

Figure 19B:
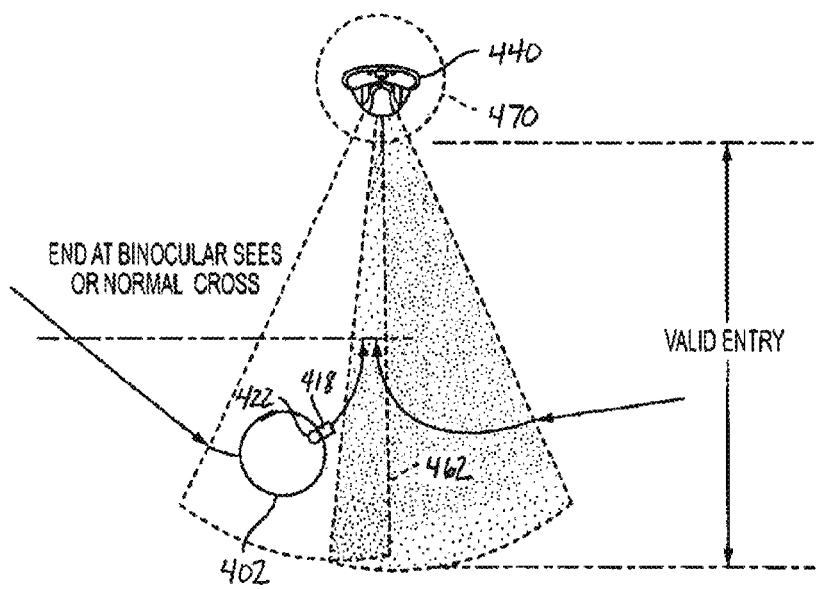

Referring to FIG. 19B, the quick turn behavior 296c is activated when the robot 302 has encountered a docking beam 450 or 460 while driving straight, spiraling, bump following, or wall following, is not in the force field 470, and has not detected the dock 440 with its directional receivers 418 in the last several seconds. When the robot 402 detects the red beam 450, it arcs clockwise toward the dock 440. When the robot 402 detects the green beam 460 or the overlap area of the red and green beams 450 and 460, it arcs counterclockwise toward the dock 440. When the robot 402 detects the other beam 450 or 460, detects the dock 440 with its directional receivers 418, or has arced more than 360 degrees, this behavior 296c aborts. Typically it is then followed by the lobe following behavior 296a.

Figure 19C:
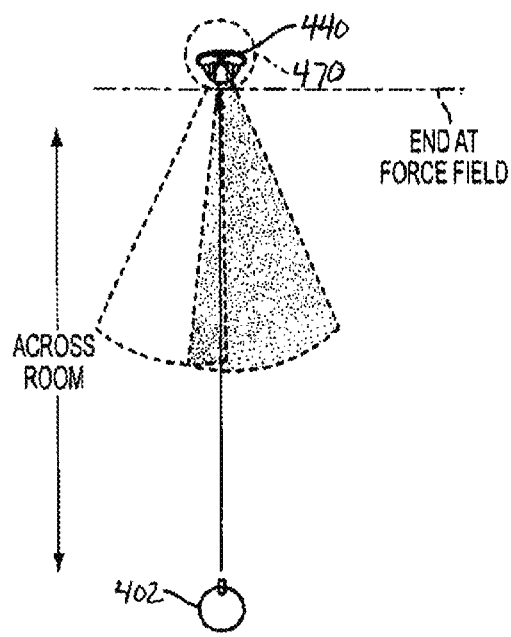

Referring to FIG. 19C, the distant homing behavior 296b is activated when the robot 402 has not detected the force field 470 in its omni-directional receiver 422 in the last several seconds, and detects the dock 440 with the directional receiver 418. If the robot 440 detects the red or green beams 450 and 460, respectively, it will drive toward them. If the robot 440 only detects the force field 470 it will drive toward the force field 470. This allows the robot 402 to approach the dock 440 from a distance at any angle. When the robot 402 detects the force field 470 with its omni-directional receiver 422 this behavior 296b aborts. During a front approach this is typically followed by the lobe following behavior 296a. During a side approach this is typically followed by the field following behavior 296d.

Figure 19D:
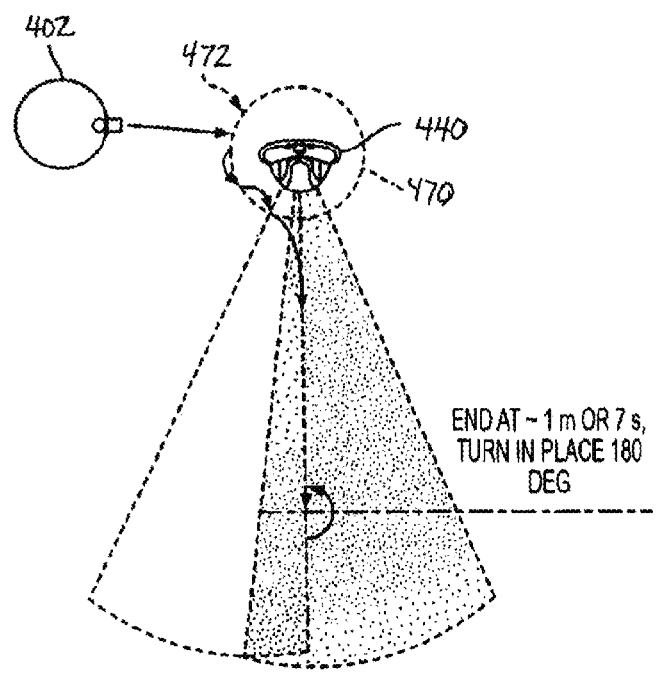

Referring to FIG. 19D, the field following behavior 296b activates when the robot 402 detects the force field 470 with its omni-directional receiver 422, has not detected the red or green beam, 450 and 460 respectively, with its omni-directional receiver 422 in the last second, and does not see the red or green beam 450 and 460, respectively, with its directional receivers 418. The robot 402 follows the edge 472 of the force field 470 with its omni-directional receiver 422 in a random direction (cw or ccw) until it detects the red or green beam, 450 and 460 respectively, a bump, a cliff, or has traveled more than 1 meter. When the robot 402 detects the red or green beam, 450 and 460 respectively, it engages in reverse lobe following 296a for a distance of about 1 meter or until a bump is detected in order to travel away from the dock 440 along the normal (zero degree) edge 462 and straighten out. Then the robot 402 turns 180 degrees or until it faces the dock 440. Then the behavior 296b aborts. Typically the lobe following behavior 296a activates next to finish docking.

Figure 19E:
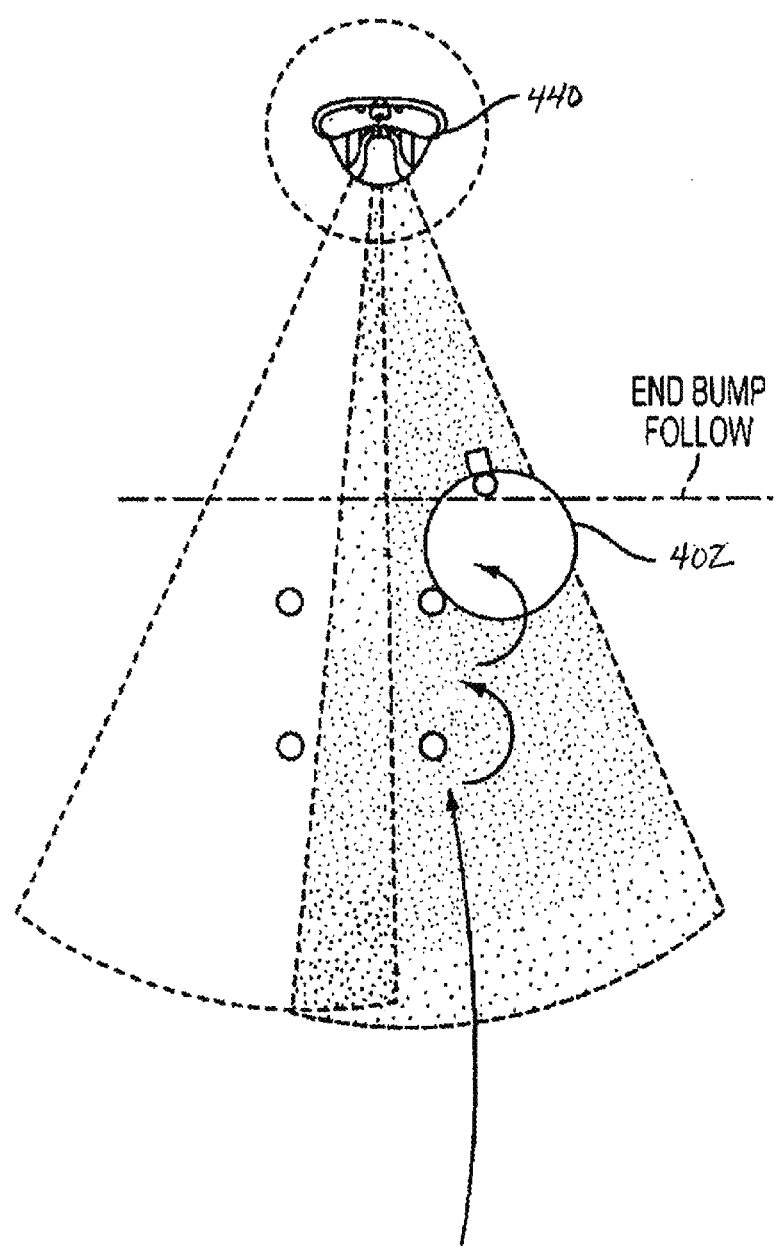

Referring to FIG. 19E, the robot 402 can dock successfully even when there are obstacles completely or partially occluding the docking beams 450 and 460 or the robot's physical access to the dock 440 from some, but not all, approach angles by executing an obstacle dock behavior 296e. When the robot 402 is seeking the dock 440 and has detected a docking beam 450 or 460 in its omni-directional receiver 422 in the last several seconds, and then also detects a bump, it activates the docking bounce behavior 264c. With about a 66% probability, the obstacle dock behavior 296e initiates a bump follow behavior 264c and with about a 33% probability, the docking bounce behavior 264d which has the robot 402 simply back up, turn a random angle between 10 and 170 degrees for side impacts or 75 and 255 degrees for front impacts, and then aborts the behavior 264d. The bump follow behavior 264c follows an edge of the obstacle with the robot's bumper until one of the following conditions occurs: a) the robot 402 detects the dock 440 with the directional receiver 418 and does not detect it with is omni-directional receiver 422, with about a 66% probability; b) the robot 402 detects a crossing of the normal (zero degree) edge 462 from right to left and is bump following 264c in a clockwise direction, or the robot 402 detects a crossing of the normal (zero degree) edge 462 from left to right and is bump following 264c in a counter-clockwise direction, with about a 66% probability; c) the robot 462 detects the force field 470 with its omni-directional receiver 422; d) 30 seconds has passed since the onset of the bump follow behavior 264c; or e) no docking beam 450 or 460 has been detected by the omni-directional receiver 422 for more than about 5 seconds.

Another possible implementation of bump follow 264c includes the robot 402 keeping track of the projected location of the dock 440 and turning preferentially toward the estimated dock location during bump follow 264c. Each time the robot 402 crosses the normal (zero degree) edge 462 while facing the dock 440 and detecting the dock 440 by its directional receiver 418, the robot 402 uses odometry to project the location of the dock 440 about 5 feet out along a direction of travel. The robot 402 can use odometry throughout the docking maneuver to estimate the orientation of itself to the projected location of the dock 440.

The combination of short bouts of bump following and normal docking methods allow the robot 402 to dock in the face of a large variety of obstacles including but not limited to walls, chairs, and boxes, as well as reflections of the IR docking beams.

In the above scenarios utilizing a base station or dock, it is possible that a cover (not shown) be provided for use on the base station or dock, allowing the base station or dock to be used solely as an avoidance beacon (e.g., to project a signal that prevents the robot from entering a pre-determined zone around the base station or dock). Similar to cover 300 described above with respect to FIGS. 6-11, a cover to be used with a base station or dock may be sized and shaped to cover at least a portion of a body of the base station or dock. In particular, a body of the cover may be configured to be positioned relative to the two navigational field emitters of the base station or dock, in order to prevent transmission of a signal from a navigational field emitter to the robot. The cover may be made of a material suitable to block infrared emissions, such as a black silicone material. An interior portion of the cover may include structure suitable to guide positioning of the cover relative to the base station or dock. Additionally, the cover to be used with the base station or dock may include an opening in a top portion thereof, the opening having a shape and size to permit an omni-directional emitter of the base station or dock to pass through the opening, such that it is not positioned within the cover. As the omni-directional emitter of the base station or dock is not positioned within the cover, its emissions are not blocked by the cover and the emissions serve to keep the robot from approaching the base station or dock.

Several patents and publications provide detailed descriptions of the robots, navigation beacons, base stations, and docks that may be used in conjunction with a cover according to the present teachings, as well as the function of such elements. "ROBOT OBSTACLE DETECTION SYSTEM", U.S. Pat. No. 6,594,844, disclosing proximity sensors such as cliff sensors and wall following sensors; "AUTONOMOUS FLOOR-CLEANING ROBOT", U.S. Pat. No. 6,883,201, disclosing a general structure of an iRobot Roomba coverage/cleaning robot and main and edge cleaning heads in detail; "METHOD AND SYSTEM FOR MULTI-MODE COVERAGE FOR AN AUTONOMOUS ROBOT", U.S. Pat. No. 6,809,490, disclosing motion control and coverage behaviors, including escape behaviors, selected by an arbiter according to the principles of behavior based robotics; and "METHOD AND SYSTEM FOR ROBOT LOCALIZATION AND CONFINEMENT", U.S. Pat. No. 6,781,338, disclosing virtual walls, i.e., robot confinement using wall-simulating directed beams, are each incorporated by reference herein in their entireties.

Other robot details and features combinable with those described herein may be found in the following U.S. patent applications entitled "AUTONOMOUS COVERAGE ROBOT NAVIGATION SYSTEM," filed Dec. 23, 2008, and having application Ser. No. 12/343,430; "COVERAGE ROBOT MOBILITY," filed Dec. 4, 2006 and having application Ser. No. 11/633,885; and "MODULAR ROBOT," filed Dec. 4, 2006 and having application Ser. No. 11/633,886; the entire contents of the aforementioned applications are hereby incorporated by reference.

Other embodiments of the present teachings will be apparent to those skilled in the art from consideration of the specification and practice of the teachings disclosed herein. It is intended that the specification and examples be considered as exemplary only, with a true scope and spirit of the present teachings being indicated by the following claims.

What is claimed is:

1. A cover structure configured to limit infrared transmission between a navigation beacon having at least two infrared emitters and a robot having at least two receivers, the structure comprising:
   a top portion defining an opening; and
   a wall portion having an upper periphery, a lower periphery, and a height extending between the upper and lower peripheries, the upper periphery of the wall portion adjoining a periphery of the top portion, the top and wall portions together defining a volume sized to receive at least a portion of a navigation beacon having a directional infrared emitter, the wall portion configured to block an infrared signal transmitted by the directional infrared emitter on the portion of the navigation beacon positionable within the volume;
   wherein the opening in the top portion is configured to fit around a base of an omni-directional infrared emitter of the navigation beacon, the omni-directional infrared emitter protruding from the opening such that the cover structure fails to impede transmission of a proximity signal field by the omni-directional infrared emitter; and
   wherein an interior of the wall portion comprises a plurality of ribs extending vertically along a length of the wall portion with respect to a surface supporting the cover structure and configured to align the wall portion relative to the omni-directional infrared emitter.

2. The structure of claim 1, wherein the structure comprises a black silicone material.

3. The structure of claim 2, wherein the top portion and the wall portion are integrally formed.

4. The structure of claim 3, further comprising a bottom flange portion, the bottom flange portion extending from a bottom of the wall portion.

5. The structure of claim 1, wherein the interior of the wall portion includes button reliefs providing alignment between the opening and the omni-directional infrared emitter.

6. A robot navigation system, comprising:
   a robot comprising a chassis, an omni-directional receiver, and at least one directional receiver;
   a navigation beacon comprising an omni-directional infrared emitter and at least one directional infrared emitter; and
   a cover structure configured to block infrared transmissions between the at least one directional infrared emitter and the directional receiver while simultaneously permitting transmissions between the omni-directional infrared emitter and at least one of the omni-directional receiver and the at least one directional receiver, the cover structure comprising:
   a top portion defining an opening; and
   a wall portion having an upper periphery, a lower periphery, and a height extending between the upper and lower peripheries, the upper periphery of the wall portion adjoining a periphery of the top portion, the top and wall portions together defining a volume sized to receive at least a portion of the navigation beacon having the at least one directional infrared emitter, the wall portion configured to block an infrared signal transmitted by the at least one directional infrared emitter on the portion of the navigation beacon positionable within the volume;
   wherein the opening in the top portion is configured to fit around a base of the omni-directional infrared emitter of the navigation beacon, the omni-directional infrared emitter protruding from the opening such that the cover structure fails to impede transmission of a proximity signal field by the omni-directional infrared emitter; and
   wherein an interior of the wall portion comprises a plurality of ribs extending vertically along a length of the wall portion with respect to a surface supporting the cover structure and configured to align the wall portion relative to the omni-directional infrared emitter.

7. The navigation system of claim 6, wherein the cover structure is made from a black silicone material.

8. The navigation system of claim 6, further comprising a second navigation beacon, and wherein the cover structure does not impede infrared transmissions between a directional infrared emitter of the second navigational beacon and the at least one directional receiver of the robot.

9. The navigational system of claim 6, wherein the wall portion comprises a black silicone material.

10. The robot navigation system of claim 6, wherein the interior of the wall portion includes button reliefs providing alignment between the opening and the omni-directional infrared emitter.

11. A method of limiting infrared transmission between a navigation beacon having an omni-directional infrared emitter and at least one directional infrared emitter and a robot having a chassis, an omni-directional receiver, and at least one directional receiver, the method comprising:
   positioning a cover structure configured to block infrared transmissions between the at least one directional infrared emitter and at least one of the directional receiver and the omni-directional receiver, the cover structure comprising:
   a top portion defining an opening; and
   a wall portion having an upper periphery, a lower periphery, and a height extending between the upper and lower peripheries, the upper periphery of the wall portion adjoining a periphery of the top portion, the top and wall portions together defining a volume sized to receive at least a portion of the navigation beacon having the at least one directional infrared emitter, the wall portion configured to block an infrared signal transmitted by the at least one directional infrared emitter on the portion of the navigation beacon positionable within the volume;
   wherein the opening in the top portion is configured to fit around a base of the omni-directional infrared emitter of the navigation beacon, the omni-directional infrared emitter protruding from the opening such that the cover structure fails to impede transmission of a proximity signal field by the omni-directional infrared emitter; and
   wherein an interior of the wall portion comprises a plurality of ribs extending vertically along a length of the wall portion with respect to a surface supporting the cover structure and configured to align the wall portion relative to the omni-directional infrared emitter; and
   substantially simultaneously positioning the omni-directional infrared emitter outside of the cover structure to permit communication with the at least one receiver.

12. The method of claim 11, wherein positioning the cover structure includes positioning the wall portion of the cover structure around the portion of the navigational beacon including the at least one directional infrared emitter.

13. The method claim 12, wherein substantially simultaneously positioning the omni-directional infrared emitter outside of the cover structure includes passing the omni-directional infrared emitter through the opening in the top of the body portion of the cover structure.

14. The method of claim 13, wherein positioning the cover structure further includes using the plurality of ribs on the wall portion of the cover structure to position the wall portion of the cover structure relative to the at least one directional infrared emitter.

15. The method of claim 14, wherein positioning the cover structure further includes positioning an extended base portion of the cover structure on the surface supporting the cover structure and a base of the navigation beacon.

16. The method of claim 12, wherein positioning the cover structure further includes positioning a cover structure made of a black silicone material between the at least one directional infrared emitter and the at least one directional receiver.

17. The method of claim 12, further comprising positioning the navigation beacon near an object to be avoided by the robot, such that the object is within a range of a signal emitted by the omni-directional infrared emitter of the navigation beacon.

18. The method of claim 17, wherein the object to be avoided is a container.

19. The method of claim 11, wherein the interior of the wall portion includes button reliefs providing alignment between the opening and the omni-directional infrared emitter.

* * * * *